(12) United States Patent
Li

(10) Patent No.: US 11,949,687 B2
(45) Date of Patent: Apr. 2, 2024

(54) ROUTER, METHOD FOR ROUTER, COMPUTER READABLE MEDIUM, AND APPARATUS

(71) Applicant: ARRIS Enterprises LLC, Suwanee, GA (US)

(72) Inventor: Ju Li, Guangdong (CN)

(73) Assignee: ARRIS Enterprises LLC, Horsham, PA (US)

( * ) Notice: Subject to any disclaimer, the term of this patent is extended or adjusted under 35 U.S.C. 154(b) by 406 days.

(21) Appl. No.: 17/236,250

(22) Filed: Apr. 21, 2021

(65) Prior Publication Data

US 2022/0046026 A1 Feb. 10, 2022

(30) Foreign Application Priority Data

Aug. 7, 2020 (CN) .......................... 202010788231.9

(51) Int. Cl.
*G06F 21/00* (2013.01)
*H04L 9/40* (2022.01)

(52) U.S. Cl.
CPC .......... *H04L 63/108* (2013.01); *H04L 63/083* (2013.01); *H04L 63/102* (2013.01)

(58) Field of Classification Search
CPC ... H04L 63/108; H04L 63/083; H04L 63/102; H04L 63/0861; H04L 45/60; H04L 41/0803; H04L 41/22; H04L 41/28
See application file for complete search history.

(56) References Cited

U.S. PATENT DOCUMENTS

| | | | | |
|---|---|---|---|---|
| 8,625,796 B1* | 1/2014 | Ben Ayed | ............. | H04W 12/64 380/258 |
| 9,355,231 B2* | 5/2016 | Disraeli | ................ | H04L 63/083 |
| 9,763,098 B2* | 9/2017 | Schushan | .............. | H04W 12/12 |
| 9,836,621 B2* | 12/2017 | Holz | ................... | H04L 63/0861 |
| 9,866,544 B2* | 1/2018 | Raounak | ............... | H04W 4/023 |
| 10,523,665 B2* | 12/2019 | Joshi | ..................... | H04W 12/06 |
| 2009/0158404 A1* | 6/2009 | Hahn | .................... | H04L 63/083 726/5 |
| 2009/0288150 A1* | 11/2009 | Toomim | .............. | G06F 21/6218 726/5 |
| 2012/0003933 A1* | 1/2012 | Baker | ................... | H04W 74/02 455/41.2 |
| 2013/0229930 A1* | 9/2013 | Akay | .................... | H04W 12/64 370/252 |

(Continued)

FOREIGN PATENT DOCUMENTS

EP 3151506 A1 * 4/2017 ....... G06F 17/30312

*Primary Examiner* — Kendall Dolly
(74) *Attorney, Agent, or Firm* — Panitch Schwarze Belisario & Nadel LLC

(57) ABSTRACT

The present disclosure relates to a router, a method for a router, a computer readable medium and an apparatus. A router is provided, comprising: a memory having instructions stored thereon; and a processor configured to execute the instructions stored on the memory to cause the router to: receive a request from a first client device to access a graphical user interface (GUI) of the router; determine whether the first client device is a trusted device according to a physical address of the first client device; and based at least on the determination that the first client device is a trusted device, allow the first client device to access the GUI of the router without entering a password.

20 Claims, 2 Drawing Sheets

(56) References Cited

U.S. PATENT DOCUMENTS

| | | | |
|---|---|---|---|
| 2015/0058749 A1* | 2/2015 | Hwu | H04L 67/52 |
| | | | 709/204 |
| 2015/0121496 A1* | 4/2015 | Caldeira De Andrada | |
| | | | H04L 63/08 |
| | | | 726/7 |
| 2015/0200925 A1* | 7/2015 | Lagerstedt | H04W 12/0431 |
| | | | 726/6 |
| 2015/0229623 A1* | 8/2015 | Grigg | H04W 12/64 |
| | | | 726/7 |
| 2015/0256973 A1* | 9/2015 | Raounak | H04W 12/069 |
| | | | 726/7 |
| 2017/0085565 A1* | 3/2017 | Sheller | G06F 21/305 |
| 2017/0220940 A1* | 8/2017 | Shaashua | G06F 16/35 |
| 2017/0359689 A1* | 12/2017 | Chhabra | H04W 8/005 |
| 2018/0227296 A1* | 8/2018 | Joshi | H04W 12/06 |
| 2018/0288046 A1* | 10/2018 | Celi, Jr. | H04L 63/0884 |
| 2020/0092293 A1* | 3/2020 | Liu | G06F 16/9535 |
| 2023/0099666 A1* | 3/2023 | Wakudkar | H04L 63/20 |
| | | | 726/1 |
| 2023/0254203 A1* | 8/2023 | Tenkod | H04W 12/04 |
| | | | 370/338 |

\* cited by examiner

ROUTER, METHOD FOR ROUTER, COMPUTER READABLE MEDIUM, AND APPARATUS

TECHNICAL FIELD

The present disclosure is related to a router and, more particularly, to accessing a graphical user interface of the router.

BACKGROUND

The router is a network device that provides two important mechanisms of routing and forwarding. A user may need to configure parameters of the router before or during use of the router to meet different needs. A Graphical User Interface (GUI) of the router generally refers to a configuration page of the router. The parameters of the router may be modified by accessing the GUI of the router. The GUI for initial login to the router typically requires the use of a universal username and password provided by a manufacturer of the router. To ensure network security, after the initial login to the router's GUI, the user is typically required to modify the username and password used to log in the router's GUI. When it is needed to reconfigure the parameters of the router during use of the router, the user needs to log in the router's GUI using the modified username and password. Currently, there is still a need to improve the convenience of use of routers.

SUMMARY

Aspects of the present disclosure are directed to a router comprising: a memory having instructions stored thereon; and a processor configured to execute the instructions stored on the memory to cause the router to: receive a request from a first client device to access a graphical user interface GUI of the router; determine whether the first client device is a trusted device according to a physical address of the first client device; and based at least on the determination that the first client device is a trusted device, allow the first client device to access the GUI of the router without entering a password.

In some embodiments, for the above router, wherein the processor is further configured to execute the instructions stored on the memory to cause the router to: receive a first user input from a second client device that is accessing the GUI of the router, and determine a physical address for each of one or more trusted devices based on the first user input.

In some embodiments, for the above router, wherein the processor is further configured to execute the instructions stored on the memory to cause the router to: receive a second user input from the second client device that is accessing the GUI of the router, and determine a valid time for each of the one or more trusted devices based on the second user input.

In some embodiments, for the above router, wherein the processor is further configured to execute the instructions stored on the memory to cause the router to: receive a third user input from a second client device that is accessing the GUI of the router, and determine the number of trusted devices for the router based on the third user input.

In some embodiments, for the above router, wherein the second client device accesses the GUI of the router over a local area network.

In some embodiments, for the above router, wherein the second client device accesses the GUI of the router by entering a password for authentication.

In some embodiments, for the above router, wherein the processor is further configured to execute the instructions stored on the memory to cause the router to: based on determination that the first client device is a trusted device determine whether the first client device is within the valid time of the first client device and if the client device is a trusted device and within the valid time of the client device, allow the client device to access the GUI of the router without entering a password.

In some embodiments, for the above router, wherein the processor is further configured to execute the instructions stored on the memory to cause the router to: if the client device is a trusted device and the client device requests to access the GUI of the router over a local area network, allow the client device to access the GUI of the router without entering a password.

In some embodiments, for the above router, wherein the processor is further configured to execute the instructions stored on the memory to cause the router to: if the client device is a trusted device and the client device requests to access the GUI of the router through an Ethernet port, allow the client device to access the GUI of the router without entering a password.

Other aspects of the present disclosure are directed to a method for a router, comprising: receiving a request from a first client device to access a graphical user interface GUI of the router; determining whether the first client device is a trusted device according to a physical address of the first client device; and based at least on the determination that the first client device is a trusted device, allowing the first client device to access the GUI of the router without entering a password.

In some embodiments, the above method further comprises: receiving a first user input from a second client device that is accessing the GUI of the router, and determining a physical address for each of one or more trusted devices based on the first user input.

In some embodiments, the above method further comprises: receiving a second user input from the second client device that is accessing the GUI of the router, and determining a valid time for each of the one or more trusted devices based on the second user input.

In some embodiments, for the above method, wherein the second client device accesses the GUI of the router over a local area network.

In some embodiments, the above method further comprises: if the client device is a trusted device and the client device requests to access the GUI of the router over a local area network, allowing the client device to access the GUI of the router without entering a password.

Other aspects of the disclosure are directed to a non-transitory computer readable medium for use with a processor, the non-transitory computer readable medium having stored thereon instructions for execution by the processor to perform the following method: receiving a request from a first client device to access a graphical user interface GUI of a router; determining whether the first client device is a trusted device according to a physical address of the first client device; and based at least on the determination that the first client device is a trusted device, allowing the first client device to access the GUI of the router without entering a password.

In some embodiments, the above non-transitory computer-readable medium further comprises instructions for execution by the processor to further perform the following: receiving a first user input from a second client device that is accessing the GUI of the router, and determining a physical address for each of one or more trusted devices based on the first user input.

In some embodiments, the above non-transitory computer-readable medium further comprises instructions for execution by the processor to further perform the following: receiving a second user input from the second client device that is accessing the GUI of the router, and determining a valid time for each of the one or more trusted devices based on the second user input.

In some embodiments, for the above non-transitory computer-readable medium, wherein the second client device accesses the GUI of the router over a local area network.

In some embodiments, the above non-transitory computer-readable medium further comprises instructions for execution by the processor to further perform the following: if the client device is a trusted device and the client device requests to access the GUI of the router over a local area network, allowing the client device to access the GUI of the router without entering a password.

Other aspects of the present disclosure are directed to an apparatus comprising means for performing the method according to the present disclosure.

BRIEF DESCRIPTION OF THE DRAWINGS

For a better understanding of the present disclosure, and to show how the same may be carried into effect, reference will now be made, by way of example, to the accompanying drawings, in which.

It is to be understood that these drawings are merely illustrative and do not restrict the scope of the disclosure.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Routers are often used in an environment, such as a corporate environment or a home environment, to facilitate user connecting to a network. Various parameters of the router, such as a password to log into the network, can be configured by accessing a Graphical User Interface (GUI) of the router, to meet different needs. However, it is not necessary to modify the configuration parameters of the router frequently, but rather, the user typically needs to log into the GUI of the router once at longer intervals. Therefore, forgetting the login password of the GUI of the router is a very common problem for the user, which will become a bad user experience for the user.

One way to solve the problem of forgetting the login password is to reset the password. For example, the password may be reset by a customer service. The user may call the customer service by telephone to help reset the password. The password may be reset at the customer service side after the user's identity is authenticated by customer service personnel. But this would cost a significant amount of customer service resources. Alternatively, the users may reset the password by making authentication on their own. However, authenticating the identity by the customer is time consuming.

In addition, the user can restore the router to a factory default value through a switch on the router, so as to solve the problem of forgetting the login password of the GUI of the router. But this would result in losing all the settings that the user had previously made to the router, which is a bad experience for the user.

To solve this problem, the present disclosure provides a method of logging in a GUI of a router without entering a password, thereby improving the user experience. A specific solution is as follows.

Figure 1:
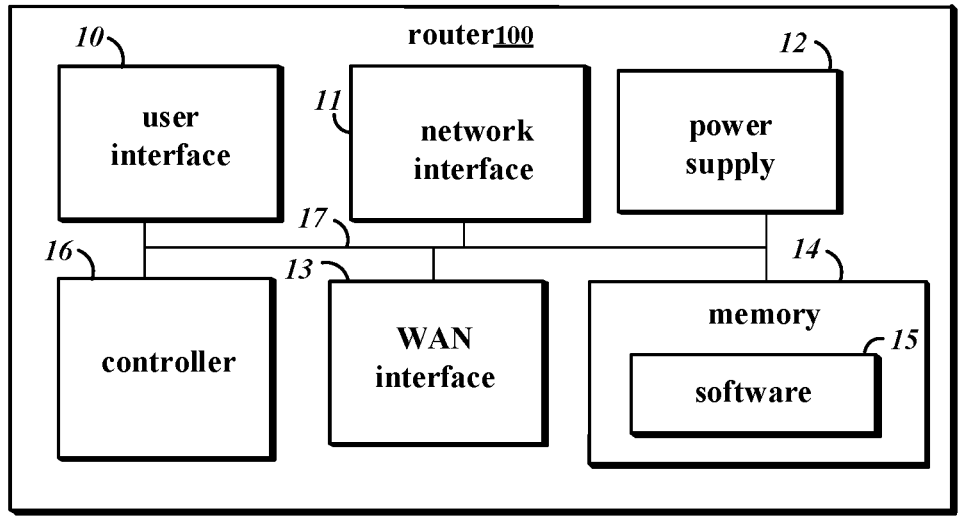
FIG. 1 illustrates an exemplary configuration block diagram of a router according to an embodiment of the present disclosure.

FIG. 1 illustrates an exemplary configuration block diagram of a router 100 according to an embodiment of the present disclosure.

Although referred to herein as a router, the router 100 may be, for example, a hardware electronic device capable of combining functions of a modem, an access point, and/or a router, for instance.

As shown in FIG. 1, the router 100 comprises a user interface 10, a network interface 11, a power supply 12, a WAN interface 13, a memory 14, and a controller 16. The user interface 10 may include, but is not limited to, a button, a keyboard, a keypad, an LCD, a CRT, a TFT, a LED, a HD, or other similar display devices, including display devices having a touch screen capability to enable interaction between the user and the gateway device. The network interface 11 may include various network cards and circuitry implemented in software and/or hardware, to enable communication with wireless extender devices and client devices using a wireless protocol such as any IEEE 802.11 Wi-Fi protocol, Bluetooth protocol, Bluetooth Low Energy (BLE) or other short range protocols operating according to wireless technology standards, for exchanging data over short distances using any licensed or unlicensed frequency band, RF4CE protocol, ZigBee protocol, Z-Wave protocol, or IEEE 802.15.4 protocol.

The power supply 12 provides power to internal components of the router 100 through an internal bus 17. The power supply 12 may be a self-contained power supply, such as a battery pack, whose interface is powered by a charger connected (e.g., directly or through another device) to a socket. The power supply 12 may also include a rechargeable battery that is removable for replacement, such as a NiCd, NiMH, Li-ion or Li-pol battery. The WAN interface 13 may include various network cards and circuitry implemented in software and/or hardware, to enable communication between the router device and an Internet service provider or Multiple System Operator (MSO).

The memory 14 comprises a single memory or one or more memories or memory locations including, but not limited to, Random Access Memory (RAM), Dynamic Random Access Memory (DRAM), Static Random Access Memory (SRAM), Read Only Memory (ROM), EPROM, EEPROM, flash memory, a logical block of an FPGA, a hard disk, or any other layer of a memory hierarchy. The memory 14 may be used to store any type of instructions, software, or algorithms, including software 15 for controlling general functions and operations of the router 100.

The processor 16 controls the general operations of the router 100 and performs management functions related to other devices such as expanders and client devices in the network. The processor 16 may include, but is not limited to, a CPU, a hardware microprocessor, a hardware processor, a multi-core processor, a single-core processor, a microcontroller, an Application Specific Integrated Circuit (ASIC), a DSP, or other similar processing devices capable of executing any type of instructions, algorithms, or software for controlling the operations and functions of the router 100 in accordance with the embodiments described in the present disclosure. The processor 16 may be various implementations of digital circuitry, analog circuitry, or mixed signal (a combination of analog and digital) circuitry that perform the functions in a computing system. The processor 16 may include, for example, an Integrated Circuit (IC), a portion or circuitry of an individual processor core, an entire processor core, an individual processor, a programmable hardware device such as a Field Programmable Gate Array (FPGA), and/or a system including multiple processors.

The internal bus 17 may be used to establish communications between the components (e.g., 10-12, 14, and 16) of the router 100.

The memory 14 of the router 100 has instructions stored thereon, and the processor 16 is configured to execute the instructions stored on the memory 14 to cause the router 100 to perform the method according to various embodiments of the present disclosure, for example, the method described in connection with FIGS. 2-4.

Figure 2:
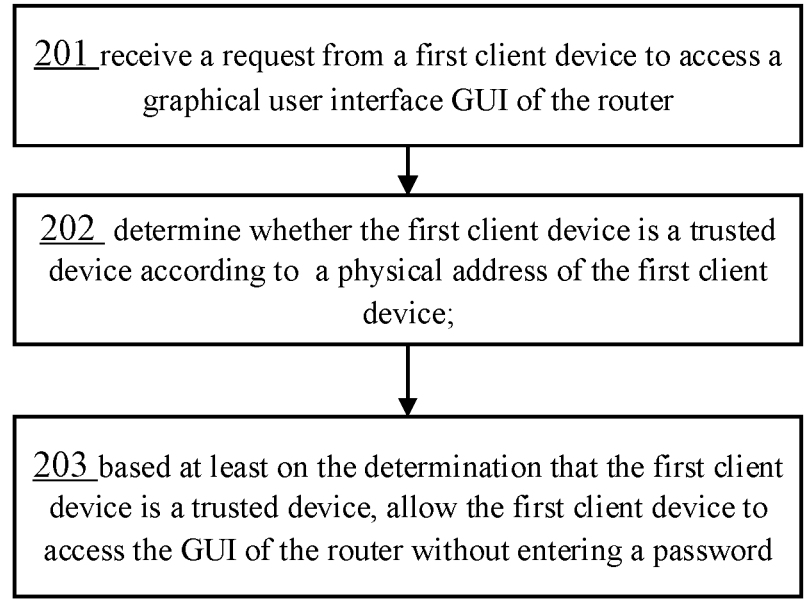
FIG. 2 a flowchart of a method which can be performed by a router according to one embodiment of the disclosure.

FIG. 2 is a flowchart of a method which can be performed by a router according to one embodiment of the disclosure. As shown in FIG. 2, in step 201, the router can receive a request from a first client device to access a graphical user interface GUI of the router. In step 202, the router can determine whether the first client device is a trusted device according to a physical address of the first client device. In step 203, based at least on the determination that the first client device is a trusted device, the router can allow the first client device to access the GUI of the router without entering a password.

Those skilled in the art will appreciate that the GUI described herein may be displayed on a display of the router. However, the GUI described herein is not necessarily limited to being integrated on the router. Rather, the GUI may be displayed on a user device separate from the router, for example, it may be displayed as a web page on a browser of a device separate from the router, or it may be displayed as a dedicated application on a device separate from the router, and so forth.

The inventive concept of the present disclosure resides in that, generally in one environment, one or more specific devices are used to configure parameters of the router. For example, in a home environment, typically only family members' client devices (e.g., mobile phones, desktop computers, notebook computers, tablet computers, etc.) are used to connect with the router. For another example, in an office environment, only a client device of a network administrator is used to set up the router. One or more client devices may be designated as a trusted device based on the physical addresses thereof and the trusted devices may be enabled to access the router's GUI without entering a login password. This enables convenient router setup, and greatly improves user experience. Meanwhile, as the password-free login is only limited to one or more trusted devices, basic security can be ensured.

The trusted devices for the router and related parameters are set up in the following manner. According to one embodiment of the disclosure, the router can receive a first user input from a second client device that is accessing a GUI of the router, and determine a physical address for each of one or more trusted devices based on the first user input. For example, the user can enter the physical address of the device which is to be set as trusted as the first user input (such as "74-E5-0B-3B-42"). The router can store this physical address. When the device having physical address "74-E5-0B-3B-42" requests to access the GUI, the router can allow the device to log in the GUI without password. For another example, user can select one or more device connecting to the network through the GUI as the first user input. The router can determine the physical address of the trusted device based on such selection.

When a client device successfully accesses the router's GUI, a physical address of a device to be set as a trusted device can be entered through the client device. The second client device may be the same client device as the first client device, or the second client device may be a different client device from the first client device.

To further ensure security, some limitations can be made. In one aspect, some further limitations can be made for trusted devices. For example, a valid time for a trusted device can be specified. That is, a device is trusted only within its valid time. For another example, the number of the trust devices can be specified. Or the way in which the trusted device accesses the GUI can be limited. In another aspect, the client device that sets up the trusted device may be further limited. Further limitations are described in detail as follows.

Figure 3:
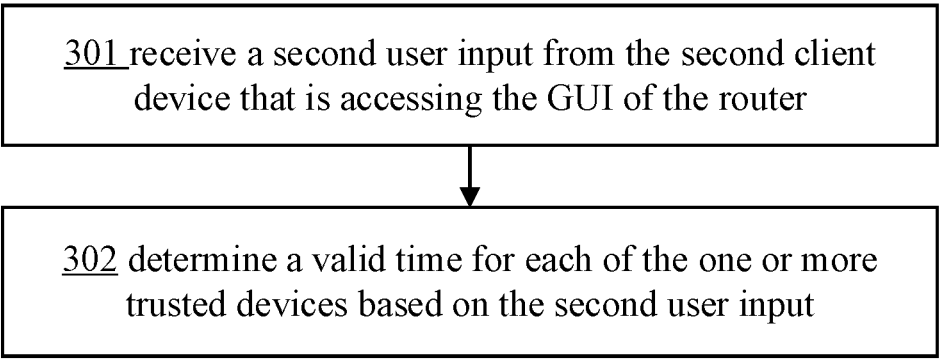
FIG. 3 is a flowchart of a method which can be further performed by a router according to one embodiment of the disclosure.
Figure 4:
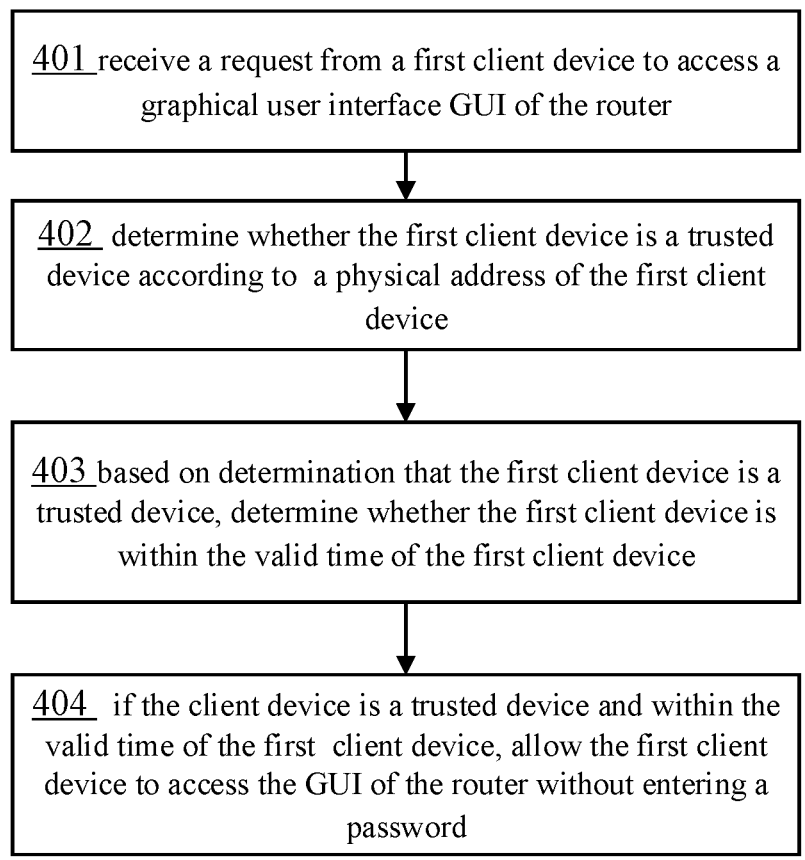
FIG. 4 is a flowchart of a method which can be further performed by a router according to one embodiment of the disclosure.

FIG. 3 is a flowchart of a method which can be further performed by a router according to one embodiment of the disclosure.

In step 301, the router can receive a second user input from the second client device that is accessing the GUI of the router. In step 302, the router can determine a valid time for each of the one or more trusted devices based on the second user input. For example, the second user input can be made by the user to select the valid time for the trusted device A as six months. According to this second user input, the router can count the valid time for the trusted device A for six months from the setting time. When the trusted device A requests to access the GUI of the router after six months from the setting time, it can not access the GUI without password.

By limiting the valid time of the trusted device, security can be increased to some extent. In one environment, some client devices may no longer be trusted for the router as the time changes. For example, in a corporate environment, a new notebook computer may be provided to a network administrator for upgrade of hardware devices, and thus the old notebook computer is no longer a trusted device for the router. In addition, the setting of a valid time of a trusted device can also remind the user of finding out a change in the environment in time, and thus improves the use safety. Typically, the user may set the valid time of the trusted device to be 3 months, 6 months, one year, or other suitable time frame related to the trusted device.

According to an embodiment of the present disclosure, the router can further receive a third user input from a second client device that is accessing the GUI of the router, and determine the number of trusted devices for the router based on the third user input. By limiting the number of trusted devices, security can be increased to some extent. For example, the third user input can be made by the user to limit the number of the trusted devices to 10 at most. Thus in this case, when there are five trusted device and the user inputs the sixth physical address, the router can provide an alert informing that there are enough trusted device and thus no more device can be set as trusted.

For another example, in order to increase security, the client device that sets up the trusted device may be further limited.

According to an embodiment of the present disclosure, the second client device accesses the GUI of the router through a local area network. That is, only those client devices who access the router's GUI over a local area network can set which client devices are trusted devices. Whereas those client devices that access, for example, through mib/TR069 cannot set which client devices are trusted devices. According to another embodiment of the present disclosure, the second client device accesses the GUI of the router by entering a password for authentication. That is, to ensure security, only those client devices who access the GUI of the router in a password login manner can set which client devices are trusted devices, while those client devices who access the GUI of the router in a password-free login manner cannot further set which client devices are trusted devices. That is, in this case, the second client device is different from the first client device. Since the trusted device can only be set by entering the password, this verifies the user's identity again before setting the trusted device, thereby further improving security.

According to an embodiment of the disclosure, when a valid time is set for the trusted device, and when the trusted device requests to access the GUI of the router, the router can make further determination. FIG. 4 is a flowchart of a method which can be further performed by a router according to one embodiment of the disclosure. As shown in FIG. 4, in step 401, the router can receive a request from a first client device to access a graphical user interface GUI of the router. In step 402, the router can determine whether the first client device is a trusted device according to a physical address of the first client device. In 403, based on determination that the first client device is a trusted device, the router can determine whether the first client device is within the valid time of the first client device. In step 404, if the client device is a trusted device and within the valid time of the first client device, the router can allow the first client device to access the GUI of the router without entering a password.

According to an embodiment of the present disclosure, it may be restricted that, the trusted devices must access the GUI of the router via a local area network in order to log in without a password. That is, when the trusted device requests to access the GUI of the router, the processor of the router performs the following operation: allowing the client device to access the GUI of the router without entering a password if the client device is a trusted device and the client device accesses the GUI of the router over the local area network. That is, it is impossible to log in without a password when access is made through a WAN side. Those skilled in the art will appreciate that the WAN-side interface is typically used for communication with an Internet service provider or Multiple System Operator (MSO). This technical feature avoids the router from being logged in without a password by an Internet service provider or a Multiple System Operator (MSO).

According to an embodiment of the present disclosure, stricter restrictions may also be imposed, such as the restriction that the trusted device must access the GUI of the router through an Ethernet port to log in without a password. That is, when the client device requests to access the GUI of the router, the processor of the router performs the following operation: allowing the client device to access the GUI of the router without entering a password if the client device is a trusted device and the client device accesses the GUI of the router through an Ethernet port. Since most client devices currently use wireless connections, this restriction will reduce ease of use while increasing security.

Other aspects of the disclosure are directed to a non-transitory computer readable medium for use with a processor, the non-transitory computer readable medium having stored thereon instructions for execution by the processor to perform the following method: receiving a request from a first client device to access a graphical user interface GUI of a router; determining whether the first client device is a trusted device according to a physical address of the first client device; and based at least on the determination that the first client device is a trusted device, allowing the first client device to access the GUI of the router without entering a password.

In some embodiments, the above non-transitory computer-readable medium further comprises instructions for execution by the processor to further perform the following: receiving a first user input from a second client device that is accessing the GUI of the router, and determining a physical address for each of one or more trusted devices based on the first user input.

In some embodiments, the above non-transitory computer-readable medium further comprises instructions for execution by the processor to further perform the following: receiving a second user input from the second client device that is accessing the GUI of the router, and determining a valid time for each of the one or more trusted devices based on the second user input.

In some embodiments, for the above non-transitory computer-readable medium, wherein the second client device accesses the GUI of the router over a local area network.

In some embodiments, the above non-transitory computer-readable medium further comprises instructions for execution by the processor to further perform the following: if the client device is a trusted device and the client device requests to access the GUI of the router over a local area network, allowing the client device to access the GUI of the router without entering a password.

Other aspects of the present disclosure are directed to an apparatus comprising means for performing the method according to the present disclosure.

The technical solution of the present disclosure can greatly reduce the bad user experience caused by the user forgetting the password. With security guaranteed, accessing the GUI of the router can be facilitated.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described above and in the drawings. For example, the one or more memories stores software or algorithms with executable instructions and the one or more processors can execute a set of instructions of the software or algorithms in association for providing a method for facilitating access to the GUI of the router in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Similarly, while operations are depicted in the drawings in a particular order, this should not be understood as requiring that such operations be performed in the particular order shown or in sequential order, or that all illustrated operations be performed, to achieve desirable results. In some cases, multitasking and parallel processing may be advantageous.

What we claim is:

1. A router comprising:
a memory having instructions stored thereon; and
a processor configured to execute the instructions stored on the memory to cause the router to:
receive a request from a first client device to access a graphical user interface (GUI) of the router;
determine whether the first client device is a trusted device according to a physical address of the first client device; and
based at least on the determination that the first client device is a trusted device, allow the first client device to access the GUI of the router without entering a password.

2. The router according to claim 1, wherein the processor is further configured to execute the instructions stored on the memory to cause the router to:
receive a first user input from a second client device that is accessing the GUI of the router, and
determine a physical address for each of one or more trusted devices based on the first user input.

3. The router according to claim 2, wherein the processor is further configured to execute the instructions stored on the memory to cause the router to:
receive a second user input from the second client device that is accessing the GUI of the router, and
determine a valid time for each of the one or more trusted devices based on the second user input.

4. The router according to claim 1, wherein the processor is further configured to execute the instructions stored on the memory to cause the router to:
receive a third user input from a second client device that is accessing the GUI of the router, and
determine the number of trusted devices for the router based on the third user input.

5. The router according to any of claims 2-4, wherein the second client device accesses the GUI of the router over a local area network.

6. The router according to any of claims 2-4, wherein the second client device accesses the GUI of the router by entering a password for authentication.

7. The router according to claim 3, wherein the processor is further configured to execute the instructions stored on the memory to cause the router to:
based on determination that the first client device is a trusted device determine whether the first client device is within the valid time of the first client device, and
if the client device is a trusted device and within the valid time of the client device, allow the client device to access the GUI of the router without entering a password.

8. The router according to claim 1, wherein the processor is further configured to execute the instructions stored on the memory to cause the router to: if the client device is a trusted device and the client device requests to access the GUI of the router over a local area network, allow the client device to access the GUI of the router without entering a password.

9. The router according to claim 1, wherein the processor is further configured to execute the instructions stored on the memory to cause the router to: if the client device is a trusted device and the client device requests to access the GUI of the router through an Ethernet port, allow the client device to access the GUI of the router without entering a password.

10. A method for a router, comprising:
receiving a request from a first client device to access a graphical user interface (GUI) of the router;
determining whether the first client device is a trusted device according to a physical address of the first client device; and
based at least on the determination that the first client device is a trusted device, allowing the first client device to access the GUI of the router without entering a password.

11. The method according to claim 10, further comprising:
receiving a first user input from a second client device that is accessing the GUI of the router, and
determining a physical address for each of one or more trusted devices based on the first user input.

12. The method according to claim 11, further comprising:
receiving a second user input from the second client device that is accessing the GUI of the router, and
determining a valid time for each of the one or more trusted devices based on the second user input.

13. The method according to claim 11, wherein the second client device accesses the GUI of the router over a local area network.

14. The method according to claim 10, further comprising: if the client device is a trusted device and the client device requests to access the GUI of the router over a local area network, allowing the client device to access the GUI of the router without entering a password.

15. An apparatus comprising;
a memory storing instructions therein; and
a processor configured to execute the instructions stored in the memory to cause the apparatus to perform the method according to any of claims 10-14.

16. A non-transitory computer readable medium for use with a processor, the non-transitory computer readable medium having stored thereon instructions, which when executed by the processor, causes the processor to perform the following method:
receiving a request from a first client device to access a graphical user interface (GUI) of a router;
determining whether the first client device is a trusted device according to a physical address of the first client device; and
based at least on the determination that the first client device is a trusted device, allowing the first client device to access the GUI of the router without entering a password.

17. The non-transitory computer-readable medium according to claim 16, further comprising instructions, which when executed by the processor, causes the processor to further perform the following:
receiving a first user input from a second client device that is accessing the GUI of the router, and
determining a physical address for each of one or more trusted devices based on the first user input.

18. The non-transitory computer-readable medium according to claim 17, further comprising instructions, which when executed by the processor, causes the processor to further perform the following:
receiving a second user input from the second client device that is accessing the GUI of the router, and
determining a valid time for each of the one or more trusted devices based on the second user input.

19. The non-transitory computer-readable medium according to claim 17 or 18, wherein the second client device accesses the GUI of the router over a local area network.

20. The non-transitory computer-readable medium according to claim 16, further comprising instructions, which when executed by the processor, causes the processor to further perform the following:
if the client device is a trusted device and the client device requests to access the GUI of the router over a local area network, allowing the client device to access the GUI of the router without entering a password.

* * * * *